UNITED STATES PATENT OFFICE.

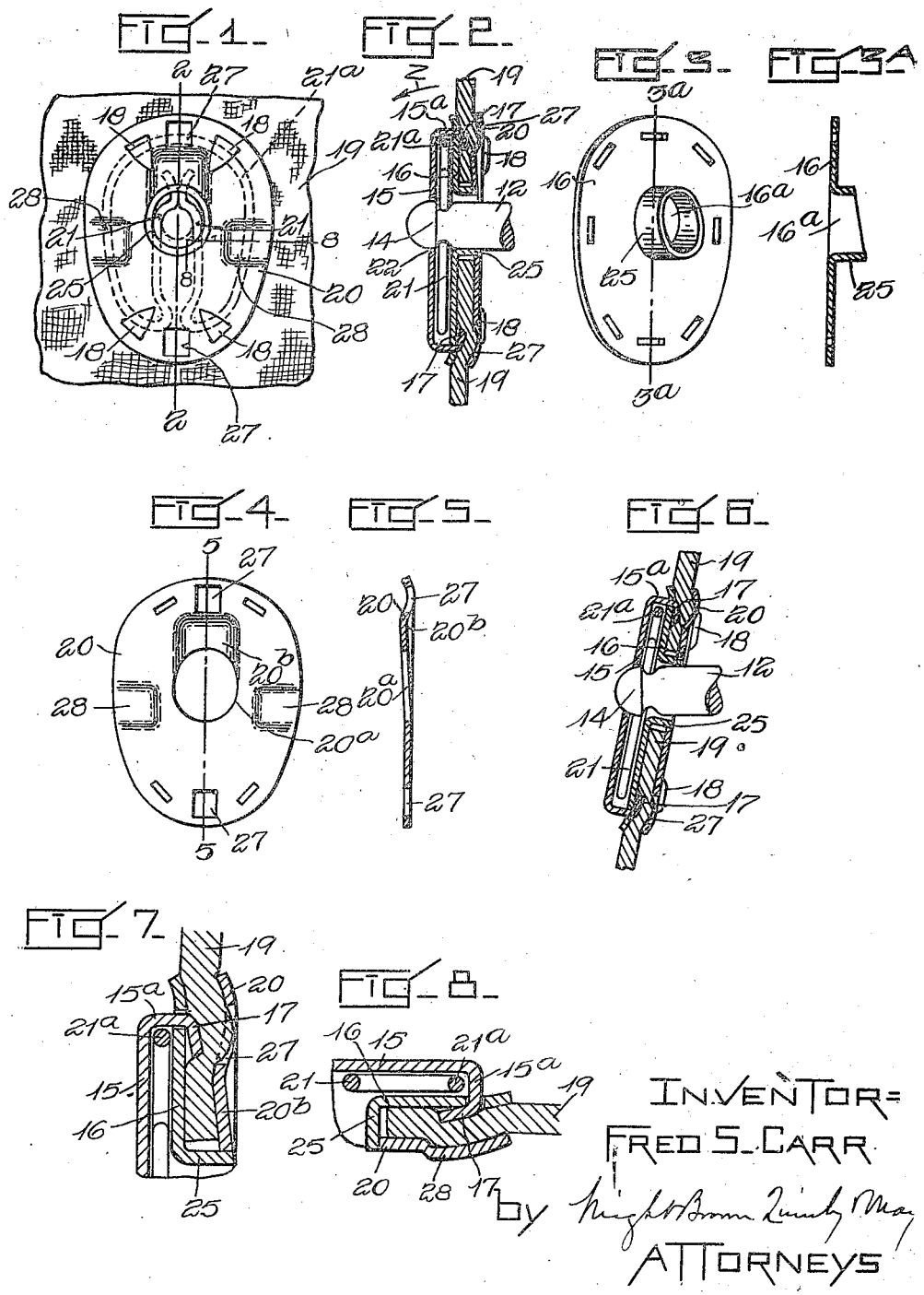

FRED S. CARR, OF BROOKLINE, MASSACHUSETTS, ASSIGNOR TO CARR FASTENER COMPANY, OF CAMBRIDGE, MASSACHUSETTS, A CORPORATION OF MAINE.

STUD-AND-SOCKET FASTENER.

1,237,489.

Specification of Letters Patent.

Patented Aug. 21, 1917.

Application filed October 22, 1916. Serial No. 127,055.

*To all whom it may concern:*

Be it known that I, FRED S. CARR, a citizen of the United States, residing at Brookline, in the county of Norfolk and State of Massachusetts, have invented new and useful Improvements in Stud-and-Socket Fasteners, of which the following is a specification.

This invention relates to a stud and socket fastener comprising, first, a cylindrical stud member having an attaching base and an annular shoulder surrounding the axis of the stud member and facing inwardly toward the base, and, secondly, a socket member composed of a casing inclosing a jaw-receiving space and having openings for the entrance of the stud member into said space, and resilient jaws confined in said space and formed to engage said annular shoulder and coöperate therewith in resisting separation of the members by a direct outward pull on the socket member.

A fastener of the type to which my invention relates is disclosed by Letters Patent of the United States, Numbers 1,038,288 and 1,184,319, each of said patented fasteners having jaws formed to engage the annular stud shoulder in such manner that separation of the members by a direct outward pull on the socket member is prevented or strongly resisted, and is freely permitted by a tipping movement of the socket member in one direction only, the shoulder and jaws resisting tipping movements of the socket member in other directions.

The fastener disclosed by Patent 1,184,319 is provided with limiting means on the said casing adapted to coöperate with the inner portion of the stud member in opposing free tipping movements of the socket member in certain directions, said limiting means being auxiliary to the limiting means provided by the shoulder and jaws, and adapted to relieve the jaws of a part of the duty heretofore imposed on them in opposing said tipping movements.

In each of said patented fasteners the socket member comprises a casing composed of an outer plate, an intermediate plate adapted to bear on one side of a flexible carrying part, which is often of textile fabric, and a back plate adapted to bear on the opposite side of said carrying part, said plates being connected to confine the carrying part between the intermediate and back plates, and provided with openings through which the stud passes, the resilient jaws being confined between the front and intermediate plates.

When the carrying part is of textile fabric, such as khaki cloth, the margin of the stud-receiving aperture formed in the portion confined between the intermediate and back plates is liable to fray so that portions of the fibers project into the stud-receiving space and interfere with the insertion of the stud member. The confined portion of the fabric is held at a number of separated points by prongs on the front plate passing through said portion and through the intermediate and back plates, and clenched on the back plate. I have found that the said confined portion is liable to be stretched and pulled outwardly at points between said prongs, the stud-receiving aperture formed in said portion being sometimes enlarged until a part of its edge protrudes at the margin of the socket member. The chief objects of the present invention are to prevent these difficulties by providing means for excluding the material of the carrying part from the stud-receiving space, and by providing clamping means at points between said prongs.

Another object is to combine in one device the limiting means of Patent 1,184,319, and the said material-excluding means.

The invention is embodied in the improvements hereinafter described and claimed.

Of the accompanying drawings forming a part of this specification,—

Figure 1 represents a rear view of the socket member of a stud and socket fastener embodying my invention.

Fig. 2 represents a section on the line 2—2 of Fig. 1, and a side view of a portion of the stud member.

Fig. 3 represents a perspective view of the intermediate plate.

Fig. 3ª represents a section on the line 3ª—3ª of Fig. 3.

Fig. 4 represents a side view of the back plate.

Fig. 5 represents a section on the line 5—5 of Fig. 4.

Fig. 6 represents a view similar to Fig. 2, showing the direction of the free or predetermined tipping movement of the socket member.

Fig. 7 represents an enlargement of a portion of Fig. 2.

Fig. 8 represents an enlarged section on the line 8—8 of Fig. 1.

The same reference characters indicate the same or similar parts in all of the views.

In the drawings,—12 represents the cylindrical stud member having at its inner portion or base a suitable means whereby it may be attached to a stud-carrying part, and at its outer portion an annular inwardly facing shoulder 14. The socket member is composed of a jaw-holding casing composed of assembled plates 15, 16 and 20, the outer plate 15 having a marginal flange 15$^a$ on which are formed short prongs 17 inserted in slots in the intermediate plate 16 and bent over the back of said plate 16 and holding it against the flange 15$^a$, the plates 15 and 16 being spaced apart and forming the sides of the jaw-receiving space. The said flange is provided with longer prongs 18 adapted to penetrate a carrying part 19 of flexible sheet material, such as textile fabric, and enter slots in the plate 16 and coinciding slots in the plate 20, between which and the plate 16 the part 19 is interposed. An opening 22 is formed in the plate 15 to receive the head of the stud member 12, said opening closely fitting the stud head and serving to center the same relatively to the casing and its jaws.

21, 21, represent resilient wire jaws which are the end portions of a piece or length of wire preferably bent as shown by Fig. 1 to form said jaws and a loop 21$^a$ connecting the same, the said jaws and loop being interposed between the plates 15 and 16. The jaws are adapted to spring into engagement with the stud shoulder 14. The jaws as here shown may be straight and substantially parallel with each other, as shown by Patent No. 1,184,319, or they may be provided with segmental portions bearing on an extended portion of said shoulder at one side of the stud, as shown by Patent 1,038,288.

The jaws coöperate with the stud shoulder in preventing or strongly resisting separation of the members by a direct outward pull on the socket member, and are freely separable from the stud shoulder only by a tipping movement of the socket member relatively to the stud member, this movement causing a portion of the shoulder to act as a wedge and separate the jaws.

To cause this wedging action of the shoulder, the socket member and jaws must be considerably inclined relatively to the axis of the stud member, as shown by Fig. 6, this inclination causing the stud shoulder to enter the space between the jaws and outwardly displace or separate the jaws.

As set forth in Patent No. 1,184,319, I have found that, by forming the casing of the socket member so that its back portion will coöperate with the stud member in permitting the longitudinal tipping of the socket member to the position shown by Fig. 6, and in preventing an opposite inclination of the socket member, the inner portion or body of the stud member is enabled to perform a considerable part of the duty of preventing all tipping movements excepting the predetermined one, the jaws and the plates between which they are confined being relieved of a corresponding part of this duty, so that strain on said jaws and plates is reduced to the minimum.

The diameter of the opening 22 in the front plate 15 is but little larger than that of the stud head, the latter fitting closely in said opening.

To enable the socket member casing to coöperate as above stated with the stud member, the socket casing plates 16 and 20 are provided respectively with stud-receiving openings 16$^a$ and 20$^a$. The lower margins of these openings are substantially in alinement with the lower margin of the opening 22 in the front plate. The openings 16$^a$ and 20$^a$ are elongated however, each being elliptical so that their upper margins are higher than the upper margin of the opening 22.

The lower margins of the openings 16$^a$ and 20$^a$ bear on the lower side of the stud body when the members are operatively connected, and prevent a sufficient tipping of the socket member in the direction of arrow $z$ (Fig. 2) to cause the stud shoulder to wedge the jaws apart. The upper margins of said openings are separated from the upper side of the stud body when the members are operatively connected, and permit the tipping of the socket member to the position shown by Fig. 6, and the outward displacement of the jaws by the stud shoulder.

The width of the elliptical openings 16$^a$, 20$^a$, is preferably such that the margins of these openings contact with the stud member at diametrically opposite sides of the latter, and coöperate with said member in preventing crosswise tipping movements of the socket member.

As thus far described, the construction and operation are substantially as set forth by Patent No. 1,184,319.

In carrying out the present invention, I provide a tubular curb 25 which surrounds the space occupied by the stud member between the intermediate plate 16 and the back plate 20, and extends from one of said plates to the other. Said curb is preferably formed integral with the plate 16, and projects therefrom into the opening 20ª in the back plate, the curb forming the margin of the opening 16ª in the intermediate plate 16. The curb therefore constitutes a bushing which occupies the stud-receiving opening in the carrying part 19, and excludes the material of said margin from the space occupied by the stud. Incidentally the curb performs the wear-reducing function of the segmental lip or flange 31 shown by Patent No. 1,184,319.

The curb 25 is necessarily elliptical to give the opening 16ª an elliptical form for the purpose above described, and to conform to the shape of the opening 20ª.

To permit the tipping of the socket member to an angle suitable for the disengagement of the jaws from the stud shoulder, I incline the apertured portion of the back plate 20 and the corresponding end of the curb 25, so that the length of the curb at one end of its major axis is less than the length at the opposite end of said axis, as shown by Figs. 1, 3 and 6, the arrangement being such that, when the socket member is tipped as shown by Fig. 6, the shorter portion of the curb comes to a bearing on the stud, and permits the socket member to be tipped to a greater angle than would be possible if the end of the curb were not thus inclined, unless the length of the major axis were increased to an objectionable extent. It is desirable to make said major axis of minimum length in order that the holding part 19 may be adequately clamped between the ends of the major axis and the margins of the plates 16 and 20.

The described inclination of the portion of the plate 20 containing the opening 20ª is caused by forming an inwardly projecting base 20ᵇ on the outer side of said plate, as shown by Figs. 4 and 5, the said base containing the opening 20ª, and being inclined inwardly from the lowest portion of said opening to a point above the highest portion thereof as best shown by Fig. 5.

When the carrying part 19 is of textile fabric and liable to stretch and slip edgewise between the points where it is transfixed and held by the longer prongs 18, such stretching and slipping is prevented by the coöperation of the shorter prongs 17 clenched on the intermediate plate 16, and recesses formed on the back plate 20, as shown by Figs. 7 and 8. Said recesses as here shown are provided by punching out portions of the back plate to form orifices 27, which are preferably rectangular, and pressing other portions of the back plate to form bosses 28. The orifices 27 coincide with two of the shorter prongs 17, so that portions of the part 19 are abruptly bent and indented by said prongs as shown by Fig. 7. The bosses 28 coincide with the other prongs 17 so that other portions of said material are abruptly bent and indented by said prongs as shown by Fig. 8. In each case the inwardly facing blunt ends of the prongs 17 act as dogs to prevent the fabric from slipping outwardly edgewise. The said recesses permit the indented portions of the fabric to bulge into the back plate, so that the prongs 17 do not prevent the predetermined spacing of the back plate from the intermediate plate, as they might do if the recesses were not provided. The curb 25 may be formed on the back or clench plate 20, instead of on the intermediate plate 16.

In another application filed by me May 3, 1917, Serial No. 166,157, I have shown and claimed a socket member structure comprising a central plate seated on one side of a carrying part and forming one side of a jaw casing, two outer plates at opposite sides of the central plate, one of said outer plates being seated on the opposite side of said carrying member, while the other outer plate is spaced from the central plate and forms the opposite side of the jaw casing, and resilient jaws confined in said casing and adapted to coöperate with the shouldered stud member, said plates being apertured to receive the stud member, one of said outer plates being provided with shorter prongs passing through slots in the central plate and clenched thereon to form dogs indenting the carrying part, and with longer prongs passing through the carrying part and through slots in the other outer plate and clenched on the latter, the last-mentioned outer plate being provided with recesses which receive the indented portions of the carrying part.

I do not therefore claim in this application a socket member structure characterized as above stated.

Having described my invention, I claim:

1. In a fastener which includes a shouldered stud member, a socket member comprising a casing composed of an outer plate, an intermediate plate adapted to bear on one side of a flexible carrying part, a back plate adapted to bear on the opposite side of said carrying part, said plates being marginally connected to confine the carrying part between the intermediate and back plates, and provided with elliptical stud-receiving openings, one of the two last-mentioned plates being provided with a tubular curb integral therewith and surrounding the stud-receiving space between the said plates and extending from plate to plate to exclude the material of the carrying part from said space, and resilient jaws confined between said outer and intermediate plates and adapted to coöperate as described with a shouldered stud.

2. In a fastener which includes a shouldered stud member, a socket member comprising a casing composed of an outer plate, an intermediate plate adapted to bear on one side of a flexible carrying part, and having an elliptical stud-receiving opening, a back plate adapted to bear on the opposite side of said carrying part, and having an inclined boss, containing an elliptical stud-receiving opening, said plates being connected to confine the carrying part between the intermediate and back plates, and one of the two last-mentioned plates being provided with a tubular elliptical curb integral therewith and surrounding the stud-receiving space between the said plates and inclined at one end, said curb excluding the material of the carrying part from said space, and resilient jaws confined between said outer and intermediate plates and adapted to coöperate as described with a shouldered stud, the elliptical form of said openings and curb permitting a predetermined tipping movement of the socket member relatively to the stud member, and the inclination of said boss and of the corresponding end of the curb facilitating said tipping movement.

In testimony whereof I have affixed my signature.

FRED S. CARR.